Sept. 30, 1924.
H. TYD
WHEEL
Filed May 6, 1921

Inventor
Herman Tyd
By his Attorneys
Randolph & O'Brien

Sept. 30, 1924.  1,510,426
H. TYD
WHEEL
Filed May 6 1921  2 Sheets-Sheet 2
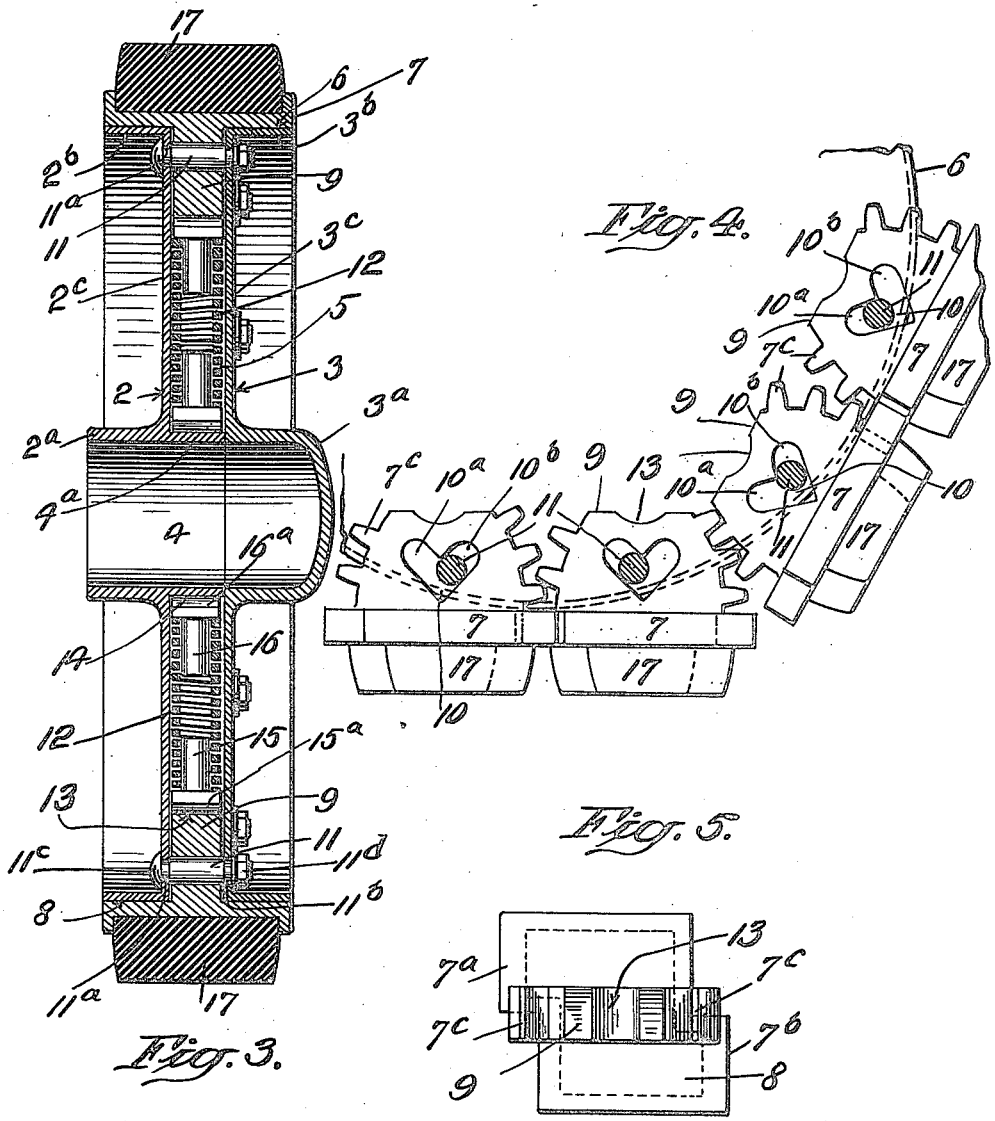

Patented Sept. 30, 1924.

1,510,426

UNITED STATES PATENT OFFICE.

HERMAN TYD, OF VALLEY STREAM, NEW YORK, ASSIGNOR OF ONE-HALF TO HENRY SEMKE, OF LYNBROOK, LONG ISLAND, NEW YORK.

WHEEL.

Application filed May 6, 1921. Serial No. 467,502.

*To all whom it may concern:*

Be it known that I, HERMAN TYD, a citizen of the United States, and a resident of Valley Stream, county of Nassau, and State of New York, have invented certain new and useful Improvements in Wheels, of which the following is a specification.

This invention relates to improvements in wheels.

One of the objects of this invention is to produce a wheel for vehicles and the like which will enable a traction surface of relatively greater extent to be procured than is possible with a wheel having a circular traction surface and thus to enable the wheel to travel over unstable or broken surfaces and to support greater loads thereupon than would be possible with ordinary circular wheels.

Another object is to produce a wheel for vehicles which will be enabled to pass over hard surfaces such as road-beds with relatively less digging in or displacement of surface elements thus preventing defacement of the road-beds with heavy loads.

Another object of my invention is to produce a wheel in which the power-transmitting properties of a circular wheel of a given diameter are materially increased by increasing or adding to the power-applying distance between the axis of the wheel and line of traction with the ground while maintaining a shorter wheel radius or distance between such axis and the circumference of rim which rolls on the sectional track.

Another object of this invention is to produce a wheel for vehicles and the like which will be enabled to pass over or bridge depressions or holes in the roadbed of relatively large size and to eliminate the usual bumping or shock due to travel over such holes or depressions.

Another object of this invention is to produce a vehicle wheel and vehicle which will be capable of climbing over obstacles with greater facility and less shock than is usual with the ordinary wheel.

Another object of my invention is to produce a wheel in which a circumferential surface will at all times be caused to ride over a substantially even, rectilinear track carried by the wheel and comprising track-sections which are automatically and successively laid down in advance of the line of rolling contact of the circumferential surface on such track sections so as to enable said surface to ride thereupon and which are also automatically elevated so soon as said rolling contact is had.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which :—

Fig. 3 is a vertical section on the line 3—3 of Fig. 1;

Fig. 4 is a fragmentary view in side elevation of the track-sections in traction contact with the ground; and Fig. 5 is a top view of a shoe removed from the wheel.

Figure 1:
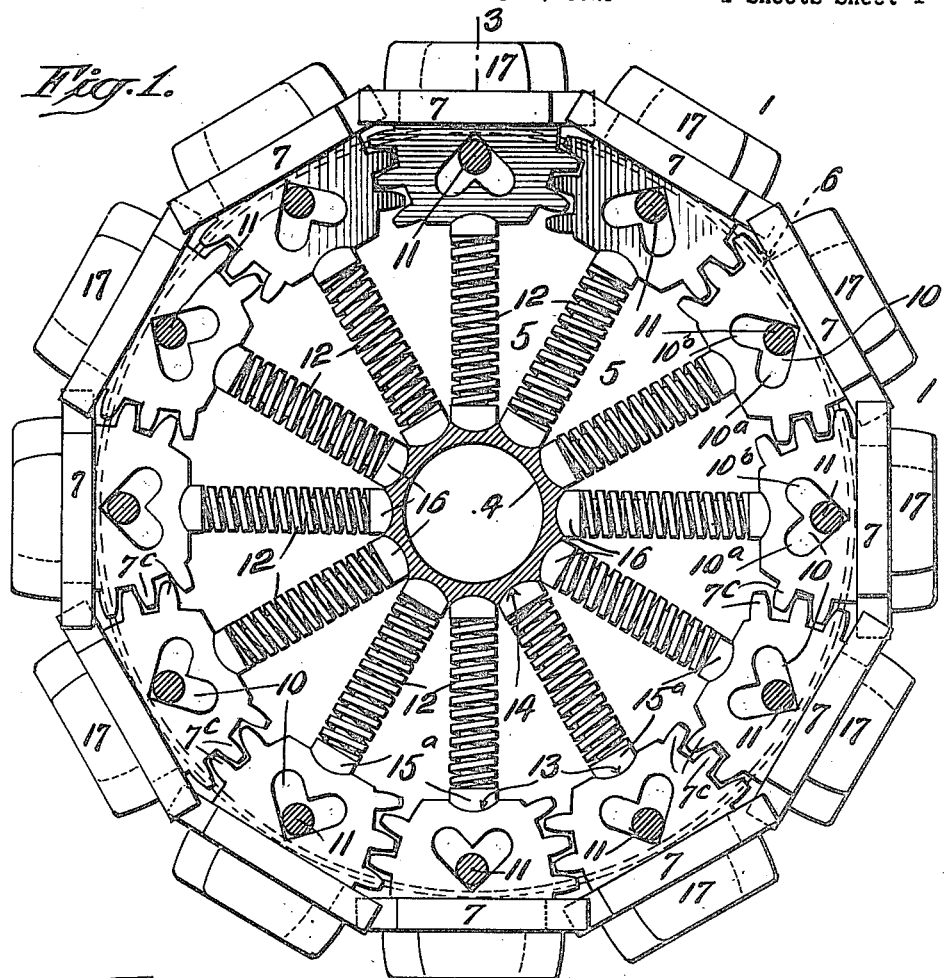
Fig. 1 is a view in side elevation of a wheel embodying my invention with the disc at one side removed and with the hub portion and bolts shown in section.
Figure 2:
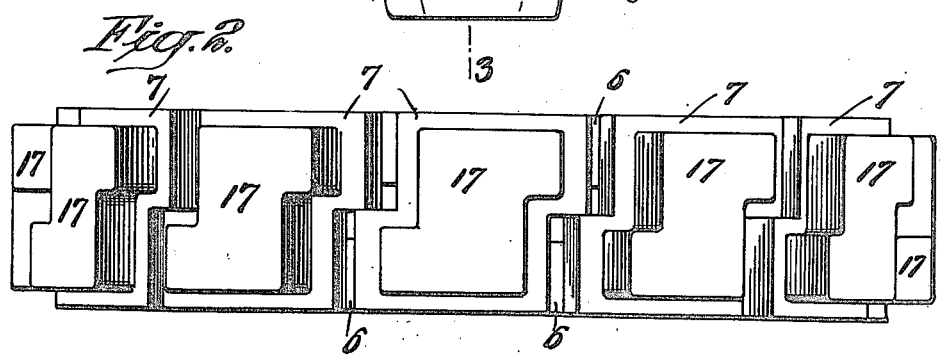
Fig. 2 is a top or plan view of the wheel shown in Fig. 1.

Referring now to these drawings, which illustrate a preferred embodiment of my invention, 1 indicates a wheel body having an axial hub or wheel-center 4 and a rim or circumferential rolling surface 6. Said body preferably comprises a pair of circular discs 2 and 3 which are, in the preferred embodiment shown, bent to provide hub-sections $2^a$—$3^a$ and perimetral flanges $2^b$—$3^b$, and are preferably spaced from each other by an intermediate hub portion $4^a$ so as to provide a circumferential space 5 between the web portions $2^c$—$3^c$ of the discs 2 and 3 respectively.

As shown, the perimetral flanges $2^b$—$3^b$ extend outwardly and in a horizontal direction and together provide a circumferential rolling surface 6 for the wheel. Mounted to ride upon this circumferential rolling surface 6 is a series of track-sections 7 having contact surfaces 8 riding upon the circumferential rolling surface 6 of the wheel and extending tangentially thereto. The track-sections 7 preferably are provided with centrally-disposed mounting projections 9 which extend inwardly and preferably fit into the space or housing formed between the web portions $2^c$—$3^c$ of the discs 2 and 3 respectively. Each of the track-sections 7 is preferably connected to the wheel body by means of said centrally disposed projections 9 and the connections between such wheel body and track-sections are made so as to permit the riding of the rectilinear surface 8 of the track-sections 7 upon the circumferential rolling surface 6 of the wheel body. The ends of each of the inward projections 9 preferably has a slot and pin connection with the discs 2 and 3 respectively. As shown, the projection 9 is provided with an angular slot 10 through which is passed a bolt 11 suitably fixed in connection with the side discs 2 and 3. Said bolt passes through apertures 11ª—11ᵇ in the opposite discs and has at one end a head 11ᶜ and at the opposite end is screw threaded and provided with a nut 11ᵈ. The slot 10, as illustrated, is composed of two angularly disposed intercommunicating sections 10ª—10ᵇ which are inclined toward the middle of the track-sections and these slots are preferably so arranged as to guide the tangential surface 8 in its relative movement with the circumferential surface 6 of the wheel body and to permit such track-sections to have this relative movement freely and without sticking.

The track-sections 7 are also preferably geared together in such relationship that the section or sections upon which the circumferential rolling surface of the wheel body is riding will cause the adjacent section in the direction of travel to be lowered into a position substantially parallel with the section upon which such rolling surface is impinging, whereby the two sections will form a smooth path or track for the circumferential rolling surface of the wheel body to ride upon.

Suitable means are preferably provided to prevent the track-section 7 from dropping inwardly toward the axis or hub portion when the said sections are raised above such axis, and for this purpose I preferably provide a series of springs 12 which are interposed between the track-sections and said hub portions. As illustrated, each of the track-sections is provided with a depressed concave socket 13 and the hub portions are provided with similar depressed sockets 14 and into these sockets 13 and 14 are fitted oppositely disposed bolts 15 and 16 which have rounded riding surfaces 15ª—16ª respectively.

The action of these springs and bolts is to force the shoes radially and resiliently outward to the limit permitted by the slot 10 and at the same time prevent flapping motion of the intermeshing track-sections during the time that such shoes are raised above the axis of the wheel body about which they turn.

As illustrated, the body or base portion 7 of the track-sections is preferably substantially Z-shaped in conformation so that portions of adjacent shoes will abut each other both circumferentially and transversely of the wheel so as to give an uninterrupted or continuous traction contact on the ground. Thus each track-section is preferably provided at one end with a projection 7ª which extends outwardly at one side of a plane extending midway between the side edges of the wheel and the opposite end of the shoe is provided with a projection 7ᵇ extending on the opposite side of such a plane. The base 7 is preferably provided with rubber pads 17 which have the same Z-shaped conformation as the shoes 7.

Having described my invention, I claim:—

1. A wheel for vehicles and the like comprising a wheel body having a traction surface composed of a series of track sections each independently connected with the wheel body and each having a plurality of teeth at each end, the teeth on adjacent ends of said track sections having at all times an intermeshing engagement with each other to move the track sections gradually into alignment as they contact with the ground and to prevent clattering.

2. A wheel for vehicles and the like comprising a wheel body having a traction surface composed of a series of track sections each having a travelling connection with the wheel body and each having a plurality of teeth at each end, the teeth on adjacent ends of said track-sections having at all times an intermeshing engagement with each other to move the track sections gradually into alignment as they contact with the ground and to prevent clattering.

3. A wheel for vehicles and the like comprising a wheel body having a traction surface composed of a series of track sections each having a travelling connection with the wheel body comprising an angular guide slot in one of said parts and a fixed pin in the other and each track section also having substantially arcuate ends provided with a plurality of gear teeth having intermeshing engagement at all times with gear teeth of adjacent ends to move the track sections gradually into alignment as they contact with the ground and to prevent clattering.

4. A wheel for vehicles and the like comprising a wheel body having a traction surface composed of a series of track sections each having a travelling connection with the wheel body comprising an angular guide slot in each track section and a fixed pin in the wheel extending through said slot and each track section also having substantially arcuate ends provided with a plurality of gear teeth having a continuous intermeshing engagement around the wheel with gear teeth of adjacent ends to move each of said track sections successively into alignment with an adjacent section as its predecessor reaches a position in engagement with ground beneath the hub and to prevent clattering.

5. A wheel embodying, in combination, a wheel body having a circumferential rolling surface and a traction surface comprising a series of track sections each provided with a rectilinear contact surface arranged tangentially of said circumferential surface and adapted upon rotation of the wheel to contact with the circumferential surface thereof, means for connecting such track sections to the wheel body and to each other to cause each of such track sections to move into alignment with adjacent sections during the rolling movement of the circumferential surface thereon, comprising a travelling connection between the wheel body and said sections and each track section also having substantially arcuate ends provided with a plurality of gear teeth having intermeshing continuous engagement with gear teeth of adjacent ends all around the wheel to move each of said track sections successively into alignment with an adjacent section as its predecessor reaches a position in engagement with ground beneath the hub and to prevent clattering.

6. A wheel comprising a series of discs spaced from each other to form a housing therebetween, a series of track sections each having a central projection fitting within said housing between said spaced discs, means for pivotally connecting said discs and track sections together and springs for forcing the shoes normally outwardly, each of said track sections also having an intermeshing gear connection with adjacent track sections comprising a plurality of teeth at each end, the teeth on adjacent ends of said track sections having continuous intermeshing engagement with each other all around the wheel to move each of said track sections successively into alignment with an adjacent section as its predecessor reaches a position in engagement with ground beneath the hub and to prevent clattering.

7. A wheel comprising a series of discs spaced from each other to form a housing therebetween, a series of track sections each having a central projection fitting within said housing between said spaced discs, a slot and pin connection between said track sections and discs and springs for forcing the track sections normally outwardly, each of said track sections also having substantially arcuate ends provided with a plurality of gear teeth having continuous intermeshing engagement with gear teeth of adjacent ends all around the wheel to move each of said track sections successively into alignment with an adjacent section as its predecessor reaches a position in engagement with ground beneath the hub and to prevent clattering.

In witness whereof, I have signed my name to the foregoing specification in the presence of a subscribing witness.

HERMAN TYD.

Witness:
HELEN V. WHIDDEN.